United States Patent
Zhang et al.

(10) Patent No.: US 9,496,994 B2
(45) Date of Patent: Nov. 15, 2016

(54) METHOD AND BASE STATION FOR DETERMINING SIZE OF TRANSMISSION BLOCKS IN SUBFRAME

(75) Inventors: Shuai Zhang, Shenzhen (CN); Bo Dai, Shenzhen (CN); Jin Xu, Shenzhen (CN)

(73) Assignee: ZTE CORPORATION (CN)

( * ) Notice: Subject to any disclaimer, the term of this patent is extended or adjusted under 35 U.S.C. 154(b) by 121 days.

(21) Appl. No.: 14/369,771

(22) PCT Filed: Mar. 20, 2012

(86) PCT No.: PCT/CN2012/072576
§ 371 (c)(1),
(2), (4) Date: Jun. 30, 2014

(87) PCT Pub. No.: WO2013/097364
PCT Pub. Date: Jul. 4, 2013

(65) Prior Publication Data
US 2014/0355558 A1 Dec. 4, 2014

(30) Foreign Application Priority Data
Dec. 30, 2011 (CN) .......................... 2011 1 0455695

(51) Int. Cl.
*H04L 5/00* (2006.01)
*H04W 28/06* (2009.01)
(Continued)

(52) U.S. Cl.
CPC ......... *H04L 5/0007* (2013.01); *H04L 27/2602* (2013.01); *H04W 28/06* (2013.01);
(Continued)

(58) Field of Classification Search
None
See application file for complete search history.

(56) References Cited

U.S. PATENT DOCUMENTS

| 2011/0176502 A1* | 7/2011 | Chung | H04W 72/042 370/329 |
| 2012/0008574 A1* | 1/2012 | Xiao | H04L 1/0007 370/329 |

(Continued)

FOREIGN PATENT DOCUMENTS

| CN | 101588565 | 11/2009 |
| CN | 101640579 | 2/2010 |

(Continued)

OTHER PUBLICATIONS

International Search Report for International Patent Application No. PCT/CN2012/072576 mailed Oct. 4, 2012.

(Continued)

*Primary Examiner* — Sulaiman Nooristany
(74) *Attorney, Agent, or Firm* — McAndrews, Held & Malloy, Ltd.

(57) ABSTRACT

A method and a base station for determining a size of transmission blocks in a subframe. The method comprises: acquiring a physical resource block allocation number $N'_{PRB}$ and a transmission block size index $I'_{TBS}$; determining a conversion relationship, and converting $N'_{PRB}$ and $I'_{TBS}$, according to a conversion relationship, respectively into $N_{PRB}$ and $I_{TBS}$ used in existing calculation for the size of a transmission blocks; and according to $N_{PRB}$ and $I_{TBS}$, calculating the size of the transmission blocks.

8 Claims, 1 Drawing Sheet

(51) Int. Cl.
*H04W 72/04* (2009.01)
*H04L 27/26* (2006.01)
*H04L 5/14* (2006.01)

(52) U.S. Cl.
CPC .......... *H04W72/0446* (2013.01); *H04L 5/001* (2013.01); *H04L 5/0044* (2013.01); *H04L 5/0094* (2013.01); *H04L 5/1469* (2013.01)

(56) References Cited

U.S. PATENT DOCUMENTS

2012/0046032 A1* 2/2012 Baldemair ............ H04L 5/0053 455/434
2012/0250541 A1* 10/2012 Ko ........................ H04L 1/0026 370/252
2014/0355451 A1* 12/2014 Kim ...................... H04L 1/0026 370/241

FOREIGN PATENT DOCUMENTS

CN 101931501 12/2010
CN 101931501 A * 12/2010
WO 2010139269 12/2010

OTHER PUBLICATIONS

Communication with Supplementary European Search Report dated Aug. 27, 2015 corresponding to European Application No. EP 12861688.5.
'3GPP TS 36.213: 3rd Generation Partnership Project; Technical Specification Group Radio Access Network; Evolved Universal Terrestrial Radio Access (E-UTRA); Physical layer procedures (Release 10), 3GPP Standard, No. V10.1.0, Mar. 30, 2011, pp. 1-115, XP050476529, Mobile Competence Centre; 650, Route Des Lucioles ; F-06921 Sophia-Antipolis Cedex; France [retrieved on Mar. 30, 2011] * section 7.1.7.
CMCC, CATT: "Un TBS Determination (RI-110423)" , 3GPP DRAFT, vol. RAN WG1, No. #63bis, Jan. 12, 2011, XP050490340, Mobile Competence Centre; 650, Route Des Lucioles ; F-06921 Sophia-Antipolis Cedex; France [retrieved on Jan. 12, 2011] * sections 2-5 *.

* cited by examiner

METHOD AND BASE STATION FOR DETERMINING SIZE OF TRANSMISSION BLOCKS IN SUBFRAME

TECHNICAL FIELD

The present disclosure relates to a mobile communication system, and in particular to a method and a base station for determining the size of transmission blocks (TB) in a subframe.

BACKGROUND

With the development of the technology of communications, LTE-A (LTE-advanced), as an advanced system of LTE, may provide spectral bandwidth of up to 100 MHz, and support communications with a higher flexibility and quality, and at the same time, the LTE-A system has very good backward compatibility. In an LTE-A system, there is a plurality of component carriers (CC). One LTE terminal can only work over a certain backward compatible CC, while an LTE-A terminal with a stronger capability may perform transmission simultaneously over multiple CCs, i.e. an LTE-A terminal transmits and receives data simultaneously over a plurality of component carriers, thereby achieving the purpose of improving bandwidth. The technology is referred to as multi-carrier aggregation technology.

With the progress of standardization, some companies propose new carrier types, endowing these carriers with new characteristics, but these do not reach an agreement. These carrier characteristics are summarized below. New carrier types mainly comprise carrier segment and extension carrier.

The carrier segment is a non-compatible carrier (referring to not providing compatibility with regard to previous versions), and the carrier segment cannot be used alone, but can only be used as a part of bandwidth of a certain backward compatible carrier, so as to increase the transmission capability of a data domain of the backward compatible carrier. The sum of bandwidth of the carrier segment and a paired backward compatible carrier is not greater than 110 resource blocks (RBs for short), and the extension carrier is a non-independently operated non-backward compatible carrier, which must be used in pair with a certain backward compatible carrier. The relevant characteristics of the extension carrier and the carrier segment are as shown below.

The characteristics of the non-compatible carrier are different from the previous R8 standard. The first 3 orthogonal frequency division multiplexing (OFDM) symbols of a subframe of R8 are used for transmitting a physical downlink control channel (PDCCH), and the remaining OFDM symbols are used for transmitting a physical downlink shared channel (PDSCH), while all the OFDM symbols included m a subframe of the current non-compatible carrier are used for transmitting the PDSCH, and the position where a cell-specific reference signal (CRS) occupies a resource element (RE for short) is also used for transmitting data information.

Statistics show that 80%-90% of system throughput in the future will occur in indoor and hotspot scenarios. As a technology which significantly increases system throughput and improves the overall network efficiency, heterogeneous networks may well satisfy the requirements proposed by LTE Advance. The heterogeneous network architecture introduces some transmission nodes with lower transmission power with respect to conventional cell base stations, comprising a picocell, femtocells and a relay used for signal relay. The introduction of these nodes may well guarantee the coverage of indoor and hotspot scenarios; the transmission power of these nodes is low, which is convenient to flexibly deploy networks; and at the same time, the coverage area of these nodes is small, which may be more convenient to use potential high frequency band spectrum of LTE Advanced. However, the introduction of new nodes change the original network topology structure, which makes inter-cell interference in such network structure become a new challenge.

In heterogeneous networks, in order to guarantee backward compatibility, the CRS is sent in each subframe. Therefore, even if in an almost blank subframe (ABS), the CRS of an aggressor cell (sector) is to be sent, while the CRS of the aggressor cell will result in significant interference for a victim (weak) UE of a neighbouring cell. In LTE common-frequency networking, the aggressor cell and the victim cell may avoid mutual conflicts of CRSs between cells by configuring different physical cell ID (PCI for short). However, the CRS of the aggressor cell may also interfere an RE corresponding to the victim UE of the neighbouring cell, which RE may be an RE of a control domain, and may also be an RE of a data domain.

When a receiver demodulates and decodes, if some unreliable data information is received, obvious mis-judgement for demodulation and decoding will be caused, making the receiver performance reduce significantly. A certain RE which is strongly interfered by the CRS of the aggressor cell is unreliable data information, and the existence of these REs which are strongly interfered makes the performance of the control domain and the data domain decrease.

In the case where the control domain RE is strongly interfered by the CRS of the aggressor cell, since the RE resources occupied by control signalling are few, if some certain REs are strongly interfered by the CRS of the aggressor cell, information about the victim UE control domain may not be received reliably, and in particular, the decoding of the physical downlink control channel may fail. In addition, knocking off the RE bearing information will increase the effective encoding rate. If only the RE which is interfered in the control domain is directly knocked off and rate matching is simply used, the performance of the control channel may also not satisfy the requirements of normal communication. The control domain comprises important system information and control information guaranteeing correct data channel decoding, and is the primary condition of normal communication of the system; therefore, guaranteeing the reliable receiving of the control domain is of great importance.

Since the special time slot of a time division-synchronous code division multiple access (TD-SCDMA) system is a fixed configuration, while the special subframe of a TD-LTE system may be flexibly selected as required, the configuration of the special subframe of TD-LTE should be reasonably selected according to service time slot configurations of the two systems and the special time slot situation of TD-SCDMA, trying to realize no mutual interference between the two systems only if the service time slots and special time slots of the two systems are synchronized. With reference to "TS36.211 Evolved Universal Terrestrial Radio Access (E-UTRA), Physical Channel sand Modulation", the standard situations of LTE-TDD special subframes are specifically as shown in Table 1 below, and Table 1 indicates the numbers of OFDM symbols occupied by a downlink pilot time slot (DwPTS), a guard period (GP) and an uplink pilot time slot (UpPTS) in different configurations.

TABLE 1

Configurations of special subframes in LTE TDD (length of DwPTS/GP/UpPTS)

| Special subframe configuration | Conventional CP | | | Extension CP | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | | 8 | 3 | |
| 2 | 10 | 3 | | 9 | 2 | |
| 3 | 11 | 2 | | 10 | 1 | |
| 4 | 12 | 1 | | 3 | 7 | 2 |
| 5 | 3 | 9 | 2 | 8 | 2 | |
| 6 | 9 | 3 | | 9 | 1 | |
| 7 | 10 | 2 | | — | — | — |
| 8 | 11 | 1 | | — | — | — |

When TD-SCDMA 2:4 is configured with TD-LTE 1:3, according to an existing LTE (LTE-A) configuration method, in order to realize synchronization between two systems so as to reduce interference, LTE TDD may only use configuration 0 and configuration 5 in Table 1, and at this moment, the DWPTSs both only need to occupy 3 symbols without a symbol bearing a service signal. In such configuration, the DWPTS cannot transmit a service, and at this moment, it is a 2:2 configuration situation with respect to upload/download (UL/DL); although 1 downlink service subframe data symbol is added when UL/DL is 1:3, due to the proportion limit of special subframes, the DWPTS reduces multiple symbols which may be used for data transmission; therefore, the peak/average throughput has a relatively large loss, and the overall efficiency is relatively low.

Therefore; the DwPTS, GP and UpPTS in special subframes are re-configured. The typical value of the number of OFDM symbols in the DwPTS is set as 5 or 6, wherein 3 OFDM symbols are used for transmission control, and the remaining OFDM symbols are used for transmitting a service; therefore, the loss of peak/average throughput is effectively improved, and the overall efficiency is significantly increased.

In the prior art, the TB size is determined according to a physical resource block allocation number $N_{PRB}$ together with a transmission block size index $I_{TBS}$. Since the number of resources which may transmit data of physical resource blocks in the scenario mentioned above changes, if the original transmission block definition method is still used, the spectrum efficiency in the scenario mentioned above will decrease. Hence, a new method for determining the size of transmission blocks needs to be considered, so as to improve the spectrum efficiency in the scenario mentioned above.

In the prior art, when a TB block is in a one-layer space multiplexing condition, the conversion relationships between the TB size and the physical resource block allocation number $N_{PRB}$ and the transmission block size index $I_{TBS}$ are as shown in Table 2 below:

TABLE 2

Size of TB block when system bandwidth is 10 PRBs in one-layer space multiplexing

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |

SUMMARY

The embodiments of the present disclosure provide a method and a base station for determining the size of transmission blocks in a subframe, so as to solve the problem of spectrum efficiency decreasing in the scenario mentioned above.

In order to solve the above problem, the present disclosure provides a method for determining the size of transmission blocks in a subframe, comprising:

acquiring a physical resource block allocation number $N'_{PRB}$ and a transmission block size index $I'_{TBS}$;

determining a conversion relationship, and converting $N'_{PRB}$ and $I'_{TBS}$, according to the conversion relationship, respectively into $N_{PRB}$ and $I_{TBS}$ used in existing calculation for the size of transmission blocks; and according to $N_{PRB}$ and $I_{TBS}$, calculating the size of the transmission blocks.

The method above may further comprise: determining the conversion relationship comprises: according to a corresponding relationship between a scenario and a conversion relationship, determining the conversion relationship in the present scenario.

The method above may further comprise the following characteristic: the conversion relationship is one of the following:

$I_{TBS}=I'_{TBS}$, $N_{PRB}=\min\{\lfloor N'_{PRB} \times A \rfloor, 110\}$;

or, $N_{PRB}=N'_{PRB}$, $I_{TBS}=\min\{\lfloor I'_{TBS} \times B \rfloor, 26\}$;

or, $I_{TBS}=I'_{TBS}$, $N_{PRB}=\max\{\lfloor N'_{PRB} \times A \rfloor, 1\}$;

or, $N_{PRB}=N'_{PRB}$, $I_{TBS}=\max\{\lfloor I'_{TBS} \times B \rfloor, 1\}$;

or, $N_{PRB}=\min\{\lfloor N'_{PRB} \times A \rfloor, 110\}$, $I_{TBS}=\min\{\lfloor I'_{TBS} \times B \rfloor, 26\}$;

or, $N_{PRB}=\max\{\lfloor N'_{PRB} \times A \rfloor, 1\}$, $I_{TBS}=\max\{\lfloor I'_{TBS} \times B \rfloor, 1\}$;

or, $N_{PRB}=\min\{\lfloor N'_{PRB} \times A \rfloor, 110\}$, $I_{TBS}=\max\{\lfloor I'_{TBS} \times B \rfloor, 1\}$;

or, $N_{PRB}=\max\{\lfloor N'_{PRB} \times A \rfloor, 1\}$, $I_{TBS}=\min\{\lfloor I'_{TBS} \times B \rfloor, 26\}$;

where A>0, and B>0.

The method above may further comprise: according to the corresponding relationship between the scenario and the conversion relationship, determining the conversion relationship in the present scenario comprises: when a physical downlink shared channel bearing the transmission blocks starts to transmit data from a first orthogonal frequency division multiplexing symbol of a time domain of a subframe, and/or, when a subframe transmitting the transmission blocks does not send a cell-specific reference signal, the conversion relationship is:

$I_{TBS}=I'_{TBS}$, $N_{PRB}=\min\{\lfloor N'_{PRB} \times A \rfloor, 110\}$, where $1/2 \leq A \leq 2$;

or, $N_{PRB}=N'_{PRB}$, $I_{TBS}=\min\{\lfloor I'_{TBS} \times B \rfloor, 26\}$, $1 \leq B \leq 2$.

Preferably, the method above may further comprise the following characteristics: according to the corresponding relationship between the scenario and the conversion relationship, determining the conversion relationship in the present scenario comprises: when resource elements of the physical downlink shared channel bearing the transmission blocks are being muting, the conversion relationship is:

$I_{TBS}=I'_{TBS}$, $N_{PRB}=\max\{\lfloor N'_{PRB} \times A \rfloor, 1\}$, $1/2 \leq A \leq 1$;

or, $N_{PRB}=N'_{PRB}$, $I_{TBS}=\max\{\lfloor I'_{TBS} \times B \rfloor, 1\}$, $1/2 \leq B \leq 1$.

the method above may further comprise the following characteristics: according to the corresponding relationship between the scenario and the conversion relationship, determining the conversion relationship in the present scenario comprises: when the number of orthogonal frequency division multiplexing symbols in a downlink pilot time slot (DwPTS) of a special subframe is 6 or 5, the conversion relationship is:

$I_{TBS}=I'_{TBS}$, $N_{PRB}=\max\{\lfloor N'_{PRB} \times A \rfloor, 1\}$, wherein $0 \leq A \leq 3/4$;

or, $N_{PRB}=N'_{PRB}$, $I_{TBS}=\max\{\lfloor I'_{TBS} \times B \rfloor, 1\}$, wherein $0 \leq B \leq 3/4$.

The method above may further comprise the following characteristics: determining the conversion relationship comprises: according to a designated parameter A and/or B configured by a high layer signalling, determining the conversion relationship:

when the high layer signalling configures the parameter A and $1 \leq A \leq 2$, $N_{PRB}=\min\{\lfloor N'_{PRB} \times A \rfloor, 110\}$; and when $0 \leq A < 1$, $N_{PRB}=\max\{\lfloor N'_{PRB} \times A \rfloor, 1\}$;

when the high layer signalling configures the parameter B and $1 \leq B \leq 2$, $I_{TBS}=\min\{\lfloor I'_{TBS} \times B \rfloor, 26\}$, and when $0 \leq B < 1$, $I_{TBS}=\max\{\lfloor I'_{TBS} \times B \rfloor, 1\}$;

when the parameter A is not configured, $N_{PRB}=N'_{PRB}$; and when the parameter B is not configured, $I_{TBS}=I'_{TBS}$.

The method above may further comprise the following characteristics: the parameter A configured by the high layer signalling is one of the following: 1, 1/5, 1/4, 1/3, 1/2, 2/3, 3/4 and 3/5, and the parameter B is one of the following; 1, 1/5, 1/4, 1/3, 1/2, 2/3, 3/4 and 3/5.

The embodiments of the present disclosure further provide a base station, comprising:

an information acquisition unit, configured for acquiring a physical resource block allocation number $N'_{PRB}$ and a transmission block size index $I'_{TBS}$;

a conversion unit, configured for determining a conversion relationship, and converting $N'_{PRB}$ and $I'_{TBS}$ according to the conversion relationship, respectively into $N_{PRB}$ and $I_{TBS}$ used in existing calculation of the size of transmission blocks; and a transmission blocks size determination unit, configured for, according to $N_{PRB}$ and $I_{TBS}$, calculating the size of the transmission blocks.

The base station above may further comprise the following characteristic: the conversion unit determining a conversion relationship comprises: according to a corresponding relationship between a scenario and a conversion relationship, determining a conversion relationship in the present scenario.

The base station above may further comprise the following characteristic: the conversion relationship is one of the following;

$I_{TBS}=I'_{TBS}$, $N_{PRB}=\min\{\lfloor N'_{PRB} \times A \rfloor, 110\}$;

or, $N_{PRB}=N'_{PRB}$, $I_{TBS}=\min\{\lfloor I'_{TBS} \times B \rfloor, 26\}$;

or, $I_{TBS}=I'_{TBS}$, $N_{PRB}=\max\{\lfloor N'_{PRB} \times A \rfloor, 1\}$;

or, $N_{PRB}=N'_{PRB}$, $I_{TBS}=\max\{\lfloor I'_{TBS} \times B \rfloor, 1\}$;

or, $N_{PRB}=\min\{\lfloor N'_{PRB} \times A \rfloor, 110\}$, $I_{TBS}=\min\{\lfloor I'_{TBS} \times B \rfloor, 26\}$;

or, $N_{PRB}=\max\{\lfloor N'_{PRB} \times A \rfloor, 1\}$, $I_{TBS}=\max\{\lfloor I'_{TBS} \times B \rfloor, 1\}$;

or, $N_{PRB}=\min\{\lfloor N'_{PRB} \times A \rfloor, 110\}$, $I_{TBS}=\max\{\lfloor I'_{TBS} \times B \rfloor, 1\}$;

or, $N_{PRB}=\max\{\lfloor N'_{PRB} \times A \rfloor, 1\}$, $I_{TBS}=\min\{\lfloor I'_{TBS} \times B \rfloor, 26\}$;

where A>0, and B>0.

The base station above may further comprise the following characteristics: the conversion unit, according to a corresponding relationship between a scenario and a conversion relationship, determining a conversion relationship in the present scenario comprises: when a physical downlink shared channel bearing the transmission blocks starts to transmit data from a first orthogonal frequency division multiplexing symbol of a time domain of a subframe, and/or, when a subframe transmitting the transmission blocks does not send a cell-specific reference signal, the conversion relationship is:

$I_{TBS}=I'_{TBS}$, $N_{PRB}=\min\{\lfloor N'_{PRB} \times A \rfloor, 110\}$, $1 \leq A \leq 2$;

or, $N_{PRB}=N'_{PRB}$, $I_{TBS}=\min\{\lfloor I'_{TBS} \times B \rfloor, 26\}$, $1 \leq B \leq 2$.

Preferably, the base station above may further comprise the following characteristics: the conversion unit, according to a corresponding relationship between a scenario and a conversion relationship, determining a conversion relationship in the present scenario comprises: when resource elements of a physical downlink shared channel bearing the transmission blocks are being muting, the conversion relationship is:

$I_{TBS}=I'_{TBS}$, $N_{PRB}=\max\{\lfloor N'_{PRB} \times A \rfloor, 1\}$, $1/2 \leq A \leq 1$;

or, $N_{PRB}=N'_{PRB}$, $I_{TBS}=\max\{\lfloor I'_{TBS} \times B \rfloor, 1\}$, $1/2 \leq B \leq 1$.

Preferably, The base station above may further comprise the following characteristics: the conversion unit, according to the corresponding relationship between the scenario and the conversion relationship, determining the conversion relationship in the present scenario comprises: when the number of orthogonal frequency division multiplexing symbols in a downlink pilot time slot (DwPTS) of a special subframe is 6 or 5, the conversion relationship is:

$I_{TBS}=I_{TBS}$, $N_{PRB}=\max\{\lfloor N'_{PRB} \times A \rfloor, 1\}$, wherein $0 \leq A \leq 3/4$;

or, $N_{PRB}=N'_{PRB}$, $I_{TBS}=\max\{\lfloor I'_{TBS} \times B \rfloor, 1\}$, wherein $0 \leq B \leq 3/4$.

the base station above may further comprise the following characteristic: the conversion unit, according to the corresponding relationship between the scenario and the conversion relationship, determining the conversion relationship in the present scenario comprises: according to a designated parameter A and/or B configured by a high layer signalling, determining a conversion relationship:

when the high layer signalling configures the parameter A and $1 \leq A \leq 2$, $N_{PRB}=\min\{\lfloor N'_{PRB} \times A \rfloor, 110\}$; when $0 \leq A < 1$, $N_{PRB}=\max\{\lfloor N'_{PRB} \times A \rfloor, 1\}$;

when the high layer signalling configures the parameter B and $1 \leq B \leq 2$, $I_{TBS}=\min\{\lfloor I'_{TBS} \times B \rfloor, 26\}$; when $0 \leq B < 1$, $I_{TBS}=\max\{\lfloor I'_{TBS} \times B \rfloor, 1\}$;

when the parameter A is not configured, $N_{PRB}=N'_{PRB}$; and when the parameter B is not configured, $I_{TBS}=I'_{TBS}$.

The base station above may further comprise the following characteristics: the parameter A configured by high layer signalling is one of the following: 1, 1/5, 1/4, 1/2, 3/4 and 3/5, and the parameter B is one of the following: 1, 1/5, 1/4, 1/2, 3/4 and 3/5.

The embodiments of the present disclosure provide a method and a base station for determining the size of a transmission blocks in a subframe., which reuses the existing TBsize (size) table, and improves the downlink spectrum efficiency through a simple conversion method.

DETAILED DESCRIPTION OF EMBODIMENTS

In the following, the embodiments of the present disclosure will be described in detail with combination of the accompanying drawings. It should be noted that without conflict, the embodiments in this application and the characteristics of the embodiments could be combined randomly with each other.

Figure 1:
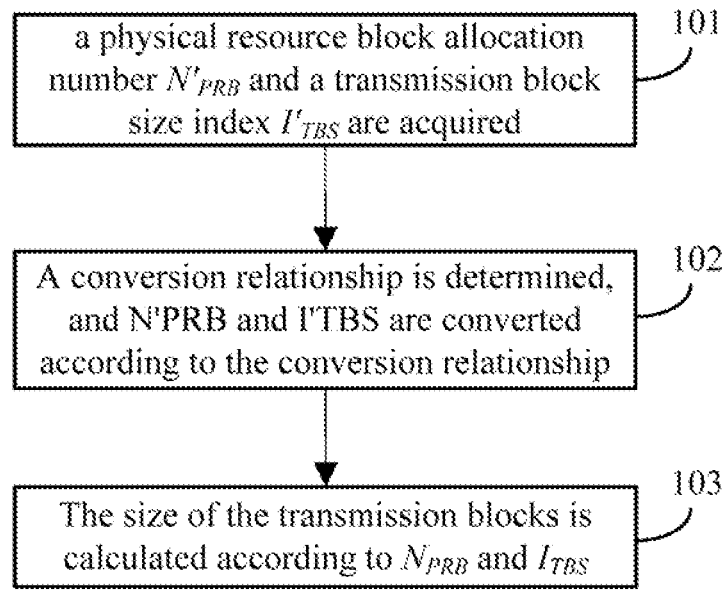
FIG. 1 is a schematic diagram of a method for determining the size of transmission blocks in a subframe in the embodiments of the present disclosure.

As shown in FIG. 1, the method for determining the size of transmission blocks in a subframe by a base station provided in the embodiments of the present disclosure comprises the following steps:

step 101, a physical resource block allocation number $N'_{PRB}$ and a transmission block size index $I'_{TBS}$ are acquired;

step 102, a conversion relationship is determined, and $N'_{PRB}$ and $I'_{TBS}$ are converted, according to the conversion relationship, respectively into $N_{PRB}$ and $I_{TBS}$ used in existing calculation for the size of transmission blocks; and step 103, according to $N_{PRB}$ and $I_{TBS}$, the size of the transmission blocks is calculated.

The step of determining a conversion relationship comprises: according to a corresponding relationship between a scenario and a conversion relationship, determining the conversion relationship in the present scenario.

The conversion relationship is one of the following $I_{TBS}=I'_{TBS}$, $N_{PRB}=\min\{\lfloor N'_{PRB} \times A \rfloor, 110\}$;

or, $N_{PRB}=N'_{PRB}$, $I_{TBS}=\min\{\lfloor I'_{TBS} \times B \rfloor, 26\}$;

or, $I_{TBS}=I'_{TBS}$, $N_{PRB}=\max\{\lfloor N'_{PRB} \times A \rfloor, 1\}$;

or, $N_{PRB}=N'_{PRB}$, $I_{TBS}=\max\{\lfloor I'_{TBS} \times B \rfloor, 1\}$;

or, $$N_{PRB}=\min\{\lfloor N'_{PRB} \times A \rfloor, 110\}, I_{TBS}=\min\{\lfloor I'_{TBS} \times B \rfloor, 26\};$$

or, $$N_{PRB}=\max\{\lfloor N'_{PRB} \times A \rfloor, 1\}, I_{TBS}=\max\{\lfloor I'_{TBS} \times B \rfloor, 1\};$$

or, $$N_{PRB}=\min\{\lfloor N'_{PRB} \times A \rfloor, 110\}, I_{TBS}=\max\{\lfloor I'_{TBS} \times B \rfloor, 1\};$$

or, $$N_{PRB}=\max\{\lfloor N'_{PRB} \times A \rfloor, 1\}, I_{TBS}=\min\{\lfloor I'_{TBS} \times B \rfloor, 26\};$$

where A>0, and B>0.

Determining a conversion relationship according to the present scenario comprises:

Scenario One:

when a PDSCH bearing the transmission blocks starts to transmit data from a first OFDM, symbol of a time domain of a subframe, and/or, when a subframe transmitting the transmission blocks does not send a cell-specific reference signal, determining the values of $N_{PRB}$ and $I_{TBS}$ required for calculating the transmission blocks according to the conversion relationship between $N'_{PRB}$ and $I'_{TBS}$ is:

when the conversion relationship between $I'_{TBS}$ and $I_{TBS}$ does not change, i.e. $I_{TBS}=I'_{TBS}$, the conversion relationship between $N'_{PRB}$ and $N_{PRB}$ is: $N_{PRB}=\min\{\lfloor N'_{PRB} \times A \rfloor, 110\}$, wherein the value range of the parameter A is $1 \leq A \leq 2$;

or, when the conversion relationship between $N'_{PRB}$ and $N_{PRB}$ does not change, i.e. $N_{PRB}=N'_{PRB}$, the conversion relationship between $I'_{TBS}$ and $I_{TBS}$ is: $I_{TBS}=\min\{\lfloor I'_{TBS} \times B \rfloor, 26\}$, wherein the value range of the parameter B is $1 \leq B \leq 2$.

Scenario Two:

when an RE of a PDSCH bearing the transmission blocks is being muting, determining the values of $N_{PRB}$ and $I_{TBS}$ required for calculating the transmission blocks according to the conversion relationship between $N'_{PRB}$ and $I'_{TBS}$ in step b is specifically:

when the conversion relationship between $I'_{TBS}$ and $I'_{TBS}$ not change, i.e. $I_{TBS}=I'_{TBS}$, the conversion relationship between $N'_{PRB}$ and $N_{PRB}$ is: $N_{PRB}=\max\{\lfloor N'_{PRB} \times A \rfloor, 1\}$, wherein the value range of the parameter A is $1/2 \leq A \leq 1$, or, when the conversion relationship between $N'_{PRB}$ and $N_{PRB}$ does not change, i.e. $N_{PRB}=N'_{PRB}$, the conversion relationship between $I'_{TBS}$ and $I_{TBS}$ is: $I_{TBS}=\max\{\lfloor I'_{TBS} \times B \rfloor, 1\}$, wherein the value range of the parameter B is $1/2 \leq B \leq 1$.

The muting RE may be a possible position of the CRS, and/or, a possible position of a zero-power CSI-RS;

Scenario Three:

when the typical value of the number of OFDM symbols in the DwPTS of a special subframe is 5 or 6, determining the values of $N_{PRB}$ and $I_{TBS}$ required for calculating the transmission blocks according to the conversion relationship between $N'_{PRB}$ and $I'_{TBS}$ step b is specifically:

when the conversion relationship between $I'_{TBS}$ and $I_{TBS}$ does not change, i.e. $I_{TBS}=I'_{TBS}$, the conversion relationship between $N'_{PRB}$ and $N_{PRB}$ is: $I_{TBS}=\max\{\lfloor I'_{TBS} \times B \rfloor, 1\}$, wherein the value range of the parameter A is $0 \leq A \leq 3/4$;

or, when the conversion relationship between $N'_{PRB}$ and $N_{PRB}$ does not change, i.e. $N_{PRB}=N'_{PRB}$, the conversion relationship between $I'_{TBS}$ and $I_{TBS}$ is: $I_{TBS}=\max\{\lfloor I'_{TBS} \times B \rfloor, 1\}$, wherein the value range of the parameter B is $0 \leq B \leq 3/4$.

It may further comprise a combination of scenarios one, two and three. Please refer to method embodiments 11-13 for details.

The step of determining a conversion relationship comprises: according to a designated parameter A and/or B configured by high layer signalling, determining a conversion relationship:

when the high layer signalling configures the parameter A and $123 A \leq 2$, $N_{PRB}=\min\{\lfloor N'_{PRB} \times A \rfloor, 110\}$, when $0 \leq A \leq 1$, $N_{PRB}=\max\{\lfloor N'_{PRB} \times A \rfloor, 1\}$;

when the high layer signalling configures the parameter B and $1 \leq B \leq 2$, $I_{TBS}=\min\{\lfloor I_{TBS} \times B \rfloor, 26\}$, when $0 \leq B < 1$, $I_{TBS}=\max\{\lfloor I'_{TBS} \times B \rfloor, 1\}$;

when the parameter A is not configured, $N_{PRB}=N'_{PRB}$; and when the parameter B is not configured, $I_{TBS}=I'_{TBS}$.

The parameter A configured by high layer signalling is one of the following, 1, 1/5, 1/4, 1/3, 1/2, 2/3, 3/4 and 3/5, and the parameter B is one of the following: 1, 1/5, 1/4, 1/3, 1/2, 2/3, 3/4 and 3/5.

The embodiments of the present disclosure provide a method for determining the size of transmission blocks in a subframe in a new carrier type, comprising:

in the present scenario, a PDSCH bearing the transmission blocks starts to transmit data from the start position of an OFDM symbol 0 or a position where a CRS is located is used for transmitting data.

When the value ranges of the parameters A and B are respectively $1 \leq A \leq 2$ and $1 < B < 2$, according to a conversion relationship between $N_{PRB}$ of transmission blocks in a subframe and a physical resource block allocation number $N'_{PRB}$, or a conversion relationship between $I_{TBS}$ of transmission blocks in a subframe and a transmission block size index $I'_{TBS}$, or a conversion relationship between $N_{PRB}$ of the transmission blocks in the subframe and the physical resource block allocation number $N'_{PRB}$ and a conversion relationship between $I_{TBS}$ and the transmission block size index $I'_{TBS}$, the size of transmission blocks in the subframe is determined.

How to use the method above to determine the size of transmission blocks in a subframe is specifically described through several embodiments below.

Method Embodiment 1

In the present embodiment, if the value of A is 1.1, according to a conversion relationship between $N_{PRB}$ and $N'_{PRB}$, $N_{PRB}=\min\{\lfloor N'_{PRB} \times 1.1 \rfloor, 110\}$, at this moment, $I_{TBS}=I'_{TBS}$, the size of transmission blocks in a subframe is determined.

For example, when $N'_{PRB}=80$ and $I'_{TBS}=10$, according to the formula above, the value of $N_{PRB}$ is 88, and thus the size of the transmission blocks in a subframe is the size of transmission blocks corresponding to the index being ($N_{PRB}=88$, $I_{TBS}=10$), i.e. is the size of the transmission blocks in a subframe when $N'_{PRB}=80$ and $I'_{TBS}=10$.

Method Embodiment 2

In the present embodiment, if the value of A is 1.2, according to a conversion relationship between $N_{PRB}$ and $N'_{PRB}$ $N_{PRB}=\min\{\lfloor N'_{PRB} \times 1.2 \rfloor, 110\}$, at this moment, $I_{TBS}=I'_{TBS}$, the size of transmission blocks in a subframe is determined.

For example, when $N'_{PRB}=80$ and $I'_{TBS}=10$, according to the formula above, the value of $N_{PRB}$ is 96, and thus the size of the transmission blocks in a subframe is the size of transmission blocks corresponding to the index being ($N_{PRB}$=96, $I_{TBS}$=10), i.e. is the size of the transmission blocks in a subframe when N'$_{PRB}$=80 and I'$_{TBS}$=10.

Method Embodiment 3

In the present embodiment, if the value of B is 1.0, according to a conversion relationship between $I_{TBS}$ and I'$_{TBS}$ $I_{TBS}$=min{⌊I'$_{TBS}$×B⌋, 26}, at this moment, $N_{PRB}$=N'$_{PRB}$, the size of transmission blocks in a subframe is determined.

For example, when N'$_{PRB}$=80 and I'$_{TBS}$=10, according to the formula above, the value of $I_{TBS}$ is 10, and thus the size of the transmission blocks in a subframe is the size of transmission blocks corresponding to the index being ($N_{PRB}$=80, $I_{TBS}$=10), i.e. is the size of the transmission blocks in a subframe when $N_{PRB}$=80 and I'$_{TBS}$=10.

The embodiments of the present disclosure further provide a method for determining the size of transmission blocks in a subframe in a heterogeneous network, the method comprising:

when the values of the parameters are respectively 1/2≤A≤1, 1/2≤B≤1 according to a conversion relationship between $N_{PRB}$ of transmission blocks in a subframe and a physical resource block allocation number N'$_{PRB}$, and a conversion relationship between $I_{TBS}$ of transmission blocks in a subframe and a transmission block size index I'$_{TBS}$, the size of transmission blocks in a subframe is determined.

How to use the method of the present disclosure to determine the size of transmission blocks in a subframe is specifically described through several embodiments below.

Method Embodiment 4

In the present embodiment, if the value of A is 0.5, according to a conversion relationship between $N_{PRB}$ and N'$_{PRB}$, $N_{PRB}$=max{⌊N'$_{PRB}$×0.5⌋, 1}, the size of transmission blocks in a subframe is determined.

For example, when N'$_{PRB}$=80 and I'$_{TBS}$=10, according to the formula above, the value of $N_{PRB}$ is 40, and thus the size of the transmission blocks in a subframe is the size of transmission blocks corresponding to the index being ($N_{PRB}$=40, $I_{TBS}$=10), i.e. is the size of the transmission blocks in a subframe when N'$_{PRB}$=80 and I'$_{TBS}$=10.

Method Embodiment 5

In the present embodiment, if the value of B is 0.75, according to a conversion relationship between $I_{TBS}$ and I'$_{TBS}$, $I_{TBS}$=max{⌊I'$_{TBS}$×0.75⌋, 1}, the size of transmission blocks in a subframe is determined.

For example, when N'$_{PRB}$=80 and I'$_{TBS}$=10, according to the formula above, the value of $I_{TBS}$ is 7, and thus the size of the transmission blocks in a subframe is the size of transmission blocks corresponding to the index being ($N_{PRB}$+80, $I_{TBS}$=7), i.e. is the size of the transmission blocks in a subframe when N'$_{PRB}$=80 and I'$_{TBS}$=10.

Method Embodiment 6

In the present embodiment, when the values of A and B are respectively 0.6 and 0.7, according to a conversion relationship between $I_{TBS}$ and I'$_{TBS}$ $N_{PRB}$=max{⌊N'$_{PRB}$×0.6⌋, 1}, and $I_{TBS}$=max{⌊I$_{TBS}$×0.7⌋, 1}, the size of transmission blocks in a subframe is determined.

For example, when N'$_{PRB}$=80 and I'$_{TBS}$=10, according to the formula above, the value of $N_{PRB}$ is 48 and the value of $I_{TBS}$ is 7, and thus the size of the transmission blocks in a subframe is the size of transmission blocks corresponding to the index being ($N_{PRB}$=48, $I_{TBS}$=7), i.e. is the size of the transmission blocks in a subframe when N'$_{PRB}$=80 and I'$_{TBS}$=10.

The embodiments of the present disclosure further provide a method for determining the size of transmission blocks in a special subframe re-configuration, the method comprising:

when the values of the parameters A and B are respectively 0≤A≤3/4 and 0≤B≤3/4, according to a conversion relationship between $N_{PRB}$ of transmission blocks in a special subframe and a physical resource block allocation number N'$_{PRB}$, and a conversion relationship between $I_{TBS}$ of transmission blocks in a special subframe and a transmission block size index I'$_{TBS}$, the size of transmission blocks in a special subframe is determined.

How to use the method of the present disclosure to determine the size of transmission blocks in a special subframe is specifically described through several embodiments below.

Method Embodiment 7

In the present embodiment, if the value of A is 0.5, according to a conversion relationship between $N_{PRB}$ and N'$_{PRB}$, $N_{PRB}$=max{⌊N'$_{PRB}$×0.5⌋, 1}, the size of transmission blocks in a special subframe is determined.

For example, when N'$_{PRB}$=6 and I'$_{TBS}$=5, according to the formula above, the value of $N_{PRB}$ is 1, and thus the size of the transmission blocks in a special subframe is the size of transmission blocks corresponding to the index being ($N_{PRB}$=3, $I_{TBS}$=5), i.e. is the size of the transmission blocks in a special subframe when N'$_{PRB}$=6 and I'$_{TBS}$=5.

Method Embodiment 8

In the present embodiment, if the value of A is 0.4, according to a conversion relationship between $N_{PRB}$ and N'$_{PRB}$ $N_{PRB}$=max{⌊N'$_{PRB}$×0.4⌋, 1}, the size of transmission blocks in a special subframe is determined.

For example, when N'$_{PRB}$=4 and I'$_{TBS}$12, according to the formula above, the value of $N_{PRB}$ is 1, and thus the size of the transmission blocks in a special subframe is the size of transmission blocks corresponding to the index being ($N_{PRB}$=1, $I_{TBS}$=12), i.e. is the size of the transmission blocks in a special subframe when N'$_{PRB}$=4 and I'$_{TBS}$=12.

Method Embodiment 9

In the present embodiment, if the value of B is 0.5, according to a conversion relationship between $I_{TBS}$ and I'$_{TBS}$ $I_{TBS}$=max{⌊I'$_{TBS}$×0.5⌋, 1}, the size of transmission blocks in a special subframe is determined.

For example, when N'$_{PRB}$=1 and I'$_{TBS}$=8, according to the formula above, the value of $I_{TBS}$ is 4, and thus the size of the transmission blocks in a special subframe is the size of transmission blocks corresponding to the index being ($N_{PRB}$=1, $I_{TBS}$=4), i.e. is the size of the transmission blocks in a special subframe when N'$_{PRB}$=1 and I'$_{TBS}$=8.

Method Embodiment 10

In the present embodiment, if the value of B is 0.4, according to a conversion relationship between $I_{TBS}$ and I'$_{TBS}$ $I_{TBS}$=max{⌊I'$_{TBS}$×0.4⌋, 1}, the size of transmission blocks in a special subframe is determined.

For example, when N'$_{PRB}$=1 and I'$_{TBS}$=14, according to the formula above, the value of $I_{TBS}$ is 5, and thus the size of the transmission blocks in a special subframe is the size of transmission blocks corresponding to the index being ($N_{PRB}$=1, $I_{TBS}$=5), i.e. is the size of the transmission blocks in a special subframe when N'$_{PRB}$=1 and I'$_{TBS}$=14.

Method 11 and 13 all describe specific situations cross-scenarios.

Method Embodiment 11

The present embodiment is a method for determining a conversion relationship between $N_{PRB}$ and $I_{TBS}$ in two scenarios of a new carrier type and a heterogeneous network. Since in the new carrier type, a PDSCH starts to transmit data from an OFDM symbol 0 or an RE position where a CRS is located is used for transmitting data, the value ranges of conversion parameters A and B are respectively 1≤A≤5/4 and 1≤B≤5/4. In a heterogeneous network, an RE of a corresponding position of a muting neighbouring cell CRS is introduced, and the number of REs occupied by the CRS between neighbouring ceils increases, and thus the number of REs for transmitting data in a subframe decreases, and at this moment, the value ranges of the conversion parameters A and B are respectively $3/4 \le A \le 1$ and $3/4 \le B \le 1$. By synthesizing the scenarios above, it is determined that the value ranges of the conversion parameters A and B in the two scenarios are respectively A=0.75 and B=0.75.

For example, when $N'_{PRB}=50$ and $I'_{TBS}=24$, according to a formula $I_{TBS}=\max\{\lfloor I'_{TBS} \times B \rfloor, 1\}$ $N_{PRB}=\max\{\lfloor N'_{PRB} \times A \rfloor, 1\}$, it is obtained that the value of $N_{PRB}$ is 37 and the value of $I_{TBS}$ is 18, and thus the size of the transmission blocks in a special subframe is the size of transmission blocks corresponding to the index being ($N_{PRB}=37$, $I_{TBS}=18$), i.e. is the size of the transmission blocks in a special subframe when $N'_{PRB}=50$ and $I'_{TBS}=24$.

Method Embodiment 12

The present embodiment is a method for determining a conversion relationship between $N_{PRB}$ and $I_{TBS}$ in two scenarios in a new carrier type and TDD special subframe reconfiguration. Since in the new carrier type, a PDSCH starts to transmit data from an OFDM symbol 0 or an RE position where a CRS is located is used for transmitting data, the value ranges of conversion parameters A and B are respectively $1 \le A \le 5/4$ and $1 \le B \le 5/4$. In a normal cyclic prefix, DwPTS:GP:UpPTS of a special subframe configuration is equal to 6:6:2 or 6:7:1; and in an extended cyclic prefix, DwPTS:GP:UpPTS length is configured as 5:5:2 or 5:6:1. It is determined that the value range of the parameter A is $1/3 \le A \le 3/4$, and it is determined that the value range of the parameter B is $1/3 \le B \le 3/4$. By synthesizing the scenarios above, it is determined that the value ranges of the conversion parameters A and B in the two scenarios are respectively A=1.0 and B=1.0.

For example, when $N'_{PRB}=50$ and $I'_{TBS}=24$, according to a formula $N_{PRB}=\min\{\lfloor N'_{PRB} \times A \rfloor, 110\}$ $I_{TBS}=\min\{\lfloor I'_{TBS} \times B \rfloor 26\}$, it is obtained that the value of $N_{PRB}$ is 50 and the value of $I_{TBS}$ is 24, and thus the size of the transmission blocks in a special subframe is the size of transmission blocks corresponding to the index being ($N_{PRB}=50$, $I_{TBS}=24$), i.e. is the size of the transmission blocks in a special subframe when $N'_{PRB}=50$ and $I'_{TBS}=24$.

Method Embodiment 13

The present embodiment is a method for determining a conversion relationship between $N_{PRB}$ and $I_{TBS}$ in two scenarios in a heterogeneous network and TDD special subframe re-configuration. In a heterogeneous network, an RE of a corresponding position of a muting neighbouring cell CRS is introduced, and the number of REs occupied by the CRS between neighbouring cells increases, and thus the number of REs for transmitting data in a subframe decreases, and at this moment, the value ranges of the conversion parameters A and B are respectively $1/2 \le A \le 3/4$ and $1/2 \le B \le 3/4$. In a normal cyclic prefix, DwPTS:GP:UpPTS of a special subframe configuration is equal to 6:6:2 or 6:7:1; and in an extended cyclic prefix, DwPTS:GP:UpPTS length is configured as 5:5:2 or 5:6:1. It is determined that the value range of the parameter A is $1/3 \le A \le 3/4$, and it is determined that the value range of the parameter B is $1/3 \le B \le 3/4$. By synthesizing the scenarios above, it is determined that the value ranges of the conversion parameters A and B in the two scenarios are respectively A=0.5 and B=0.5.

For example, when $N'_{PRB}=50$ and $I'_{TBS}=20$, according to a formula $I_{TBS}=\max\{\lfloor I'_{TBS} \times B \rfloor, 1\}$ $N_{PRB}=\max\{\lfloor N'_{PRB} \times A \rfloor, 1\}$, it is obtained that the value of $N_{PRB}$ is 25 and the value of $I_{TBS}$ is 10, and thus the size of the transmission blocks in a special subframe is the size of transmission blocks corresponding to the index being ($N_{PRB}=25$, $I_{TBS}=10$), i.e. is the size of the transmission blocks in a special subframe when $N'_{PRB}=50$ and $I'_{TBS}=20$.

Method Embodiment 14

In the present embodiment, high layer signalling configures specific numerical values of a parameter A and a parameter B in a conversion relationship between $N'_{PRB}$ and $I'_{TBS}$. The value of the parameter A configured by the high layer signalling may be one of (1, 1/5, 1/4, 1/2, 3/4, 3/5), wherein the parameter A prefers (1, 1/2, 3/4), and the parameter B configured by the high layer signalling may be one of (1, 1/5, 1/4, 1/2, 3/4, 3/5), wherein the parameter B prefers (1, 1/2, 3/4):

For example, in a high layer signalling configuration, if the parameter A and the parameter B are respectively configured as 1/2 and 1/4, when $N'_{PRB}=50$ and $I'_{TBS}=20$, according to $I_{TBS}=\max\{\lfloor I'_{TBS} \times B \rfloor, 1\}$, $N_{PRB}=\max\{\lfloor N'_{PRB} \times A \rfloor, 1\}$, it is obtained that the value of $N_{PRB}$ is 25 and the value of $I_{TBS}$ is 5, and thus the size of the transmission blocks in a special subframe is the size of transmission blocks corresponding to the index being ($N_{PRB}=25$, $I_{TBS}=5$), i.e. is the size of the transmission blocks in a special subframe when $N'_{PRB}=50$ and $I'_{TBS}20$.

Figure 2:
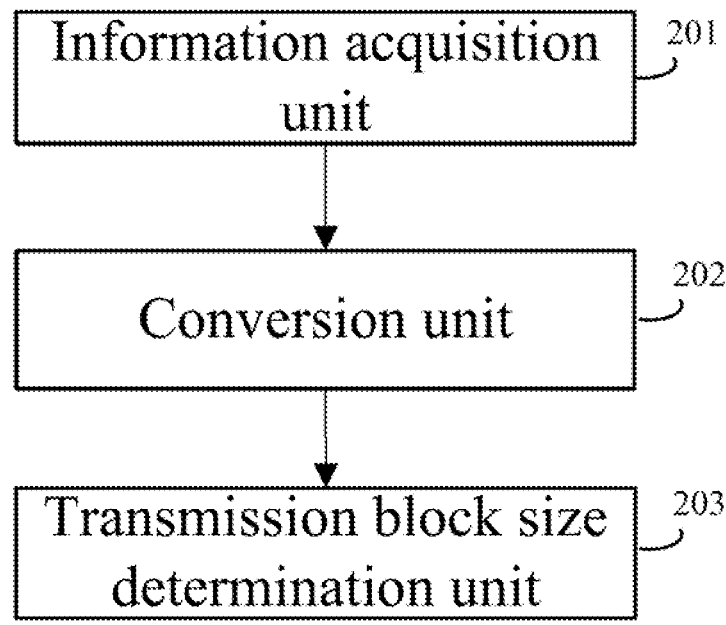
FIG. 2 is a block diagram of a base station of the embodiments of the present disclosure.

The embodiments of the present disclosure further provide a base station, as shown in FIG. 2, comprising:

an information acquisition unit 201, configured for acquiring a physical resource block allocation number $N'_{PRB}$ and a transmission block size index $I'_{TBS}$;

a conversion unit 202, configured for determining a conversion relationship, and converting $N'_{PRB}$ and $I'_{TBS}$, according to the conversion relationship, respectively into $N_{PRB}$ and $I_{TBS}$ used in existing calculation of the size of transmission blocks; and a transmission blocks size determination unit 203, configured for, according to $N_{PRB}$ and $I_{TBS}$, calculating the size of the transmission blocks. The conversion unit determining a conversion relationship comprises: according to a corresponding relationship between a scenario and a conversion relationship, determining a conversion relationship in the present scenario.

The conversion relationship is one of the following:

$$I_{TBS}=I'_{TBS}, N_{PRB}=\min\{\lfloor N'_{PRB} \times A \rfloor, 110\};$$

or $$N_{PRB}=N'_{PRB}, I_{TBS}=\min\{\lfloor I'_{TBS} \times B \rfloor, 26\};$$

or, $$I_{TBS}=I'_{TBS}, N_{PRB}=\max\{\lfloor N'_{PRB} \times A \rfloor, 1\};$$

or, $$N_{PRB}=N'_{PRB}, I_{TBS}=\max\{\lfloor I'_{TBS} \times B \rfloor, 1\};$$

or, $$N_{PRB}=\min\{\lfloor N'_{PRB} \times A \rfloor, 110\}, I_{TBS}=\min\{\lfloor I'_{TBS} \times B \rfloor, 26\};$$

or, $$N_{PRB}=\max\{\lfloor N'_{PRB} \times A \rfloor, 1\}, I_{TBS}=\max\{\lfloor I'_{TBS} \times B \rfloor, 1\};$$

or, $$N_{PRB}=\min\{\lfloor N'_{PRB} \times A \rfloor, 110\}, I_{TBS}=\max\{\lfloor I'_{TBS} \times B \rfloor, 1\};$$

or, $$N_{PRB}=\max\{\lfloor N'_{PRB} \times A \rfloor, 1\}, I_{TBS}=\min\{\lfloor I'_{TBS} \times B \rfloor, 26\};$$

where A>0, and B>0.

The conversion unit, according to a corresponding relationship between a scenario and a conversion relationship, determining a conversion relationship in the present scenario comprises: when a physical downlink shared channel bearing the transmission blocks starts to transmit data from a first orthogonal frequency division multiplexing symbol of a time domain of a subframe, and/or, when a subframe transmitting the transmission blocks does not send a cell-specific reference signal, the conversion relationship is:

$$I_{TBS}=I'_{TBS}, N_{PRB}=\min\{\lfloor N'_{PRB} \times A \rfloor, 110\}, \text{ where } 1 \leq A \leq 2;$$

or, $$N_{PRB}=N'_{PRB}, I_{TBS}=\min\{\lfloor I'_{TBS} \times B \rfloor, 26\}, \text{ where } 1 \leq B \leq 2.$$

The conversion unit, according to a corresponding relationship between a scenario and a conversion relationship, determining a conversion relationship in the present scenario comprises: when resource elements of a physical downlink shared channel bearing the transmission blocks is being muting, the conversion relationship is:

$$I_{TBS}=I'_{TBS}, N_{PRB}=\max\{\lfloor N'_{PRB} \times A \rfloor, 1\}, \text{ where } 1/2 \leq A \leq 1;$$

or, $$N_{PRB}=N'_{PRB}, I_{TBS}=\max\{\lfloor I'_{TBS} \times B \rfloor, 1\}, \text{ where } 1/2 \leq B \leq 1.$$

The conversion unit, according to a corresponding relationship between a scenario and a conversion relationship, determining a conversion relationship in the present scenario comprises: when the number of orthogonal frequency division multiplexing symbols in a DwPTS of a special subframe is 6 or 5, the conversion relationship is:

$$I_{TBS}=I'_{TBS}, N_{PRB}=\max\{\lfloor N'_{PRB} \times A \rfloor, 1\}, \text{ where } 0 \leq A \leq 3/4;$$

or, $$N_{PRB}=N'_{PRB}, I_{TBS}=\max\{\lfloor I'_{TBS} \times B \rfloor, 1\}, \text{ where } 0 \leq B \leq 3/4.$$

The conversion unit, according to a corresponding relationship between a scenario and a conversion relationship, determining a conversion relationship in the present scenario comprises: according to a designated parameter A and/or B configured by high layer signalling, determining a conversion relationship:

when the high layer signalling configures the parameter A and $1 \leq A \leq 2$, $N_{PRB}=\min\{\lfloor N'_{PRB} \times A \rfloor, 110\}$, when $0 \leq A < 1$, $N_{PRB}=\max\{\lfloor N'_{PRB} \times A \rfloor, 1\}$;

when the high layer signalling configures the parameter B and $1 \leq B \leq 2$, $I_{TBS}=\min\{\lfloor I'_{TBS} \times B \rfloor, 26\}$, when $0 \leq B < 1$, $N_{PRB}=\max\{\lfloor N'_{PRB} \times A \rfloor, 1\}$;

when the parameter A is not configured, $N_{PRB}=N'_{PRB}$; and when the parameter B is not configured, $I_{TBS}=I'_{TBS}$.

The parameter A configured by high layer signalling is one of the following: 1, 1/5, 1/4, 1/2, 3/4 and 3/5, and the parameter B is one of the following: 1, 1/5, 1/4, 1/2, 3/4 and 3/5.

Those skilled in the field can understand that all or part of the steps in the aforementioned method can be completed by instructing related hardware with the program, and said program can be stored in a computer readable storage medium, such as read-only memory, magnetic disk, or CD-ROM and so on. Optionally, all or some of the steps of the aforementioned embodiments can be implemented with one or more integrated circuits. Accordingly, each module/unit in the aforementioned embodiments can be implemented in the form of hardware or software functional modules. The present disclosure is not limited to any particular form of hardware and software combination.

INDUSTRIAL APPLICABILITY

The embodiments of the present disclosure reuse the existing TB size (size) table and improve the downlink spectrum efficiency through a simple conversion method.

What is claimed is:

1. A method for determining a size of transmission blocks in a subframe, comprising:
   acquiring a physical resource block allocation number $N'_{PRB}$ and a transmission block size index $I'_{TBS}$;
   determining a conversion relationship, and converting $N'_{PRB}$ and $I'_{TBS}$, according to the conversion relationship, respectively into $N_{PRB}$ and $I_{TBS}$ used in existing calculation for a size of transmission blocks; and
   calculating the size of the transmission blocks according to $N_{PRB}$ and $I_{TBS}$;
   wherein determining the conversion relationship comprises: determining the conversion relationship in the present scenario according to a corresponding relationship between a scenario and a conversion relationship;
   wherein determining the conversion relationship in the present scenario according to a corresponding relationship between a scenario and a conversion relationship comprises:
   when a physical downlink shared channel bearing the transmission blocks starts to transmit data from a first orthogonal frequency division multiplexing symbol in a time domain of a subframe, and/or, when a subframe transmitting the transmission blocks does not send a cell-specific reference signal, the conversion relationship is:

$$I_{TBS}=I'_{TBS}, N_{PRB}=\min\{\lfloor N'_{PRB} \times A \rfloor, 110\}, 1 \leq A \leq 2; \text{ or,}$$

$$N_{PRB}=N'_{PRB}, I_{TBS}=\min\{\lfloor I'_{TBS} \times B \rfloor, 26\}, 1 \leq B \leq 2;$$

when resource elements of the physical downlink shared channel bearing the transmission blocks are being muting, the conversion relationship is:

$$I_{TBS}=I'_{TBS}, N_{PRB}=\max\{\lfloor N'_{PRB} \times A \rfloor, 1\}, 1/2 \leq A \leq 1; \text{ or,}$$

$$N_{PRB}=N'_{PRB}, I_{TBS}=\max\{\lfloor I'_{TBS} \times B \rfloor, 1\}, 1/2 \leq B \leq 1;$$

if the number of orthogonal frequency division multiplexing symbols in a downlink pilot time slot (DwPTS) of a special subframe is 6 or 5, the conversion relationship is:

$$I_{TBS}=I'_{TBS}, N_{PRB}=\max\{\lfloor N'_{PRB} \times A \rfloor, 1\}, \text{ where } 0 \leq A \leq 3/4; \text{ or,}$$

$$N_{PRB}=N'_{PRB}, I_{TBS}=\max\{\lfloor I'_{TBS} \times B \rfloor, 1\}, \text{ where } 0 \leq B \leq 3/4.$$

2. The method according to claim 1, when 0≤A≤1, the parameter A is one of the following: 1, 1/5, 1/4, 1/3, 1/2, 2/3, 3/4 and 3/5, and when 0≤B≤1, the parameter B is one of the following: 1, 1/5, 1/4, 1/3, 1/2, 2/3, 3/4 and 3/5.

$I_{TBS}=I'_{TBS}, N_{PRB}=\min\{\lfloor N'_{PRB} \times A \rfloor, 110\};$ $N_{PRB}=N'_{PRB}, I_{TBS}=\min\{\lfloor N'_{TBS} \times B \rfloor, 26\};$ $I_{TBS}=I'_{TBS}, N_{PRB}=\max\{\lfloor N'_{PRB} \times A \rfloor, 1\};$ $N_{PRB}=N'_{PRB}, I_{TBS}=\max\{\lfloor I'_{TBS} \times B \rfloor, 1\};$ $N_{PRB}=\min\{\lfloor N'_{PRB} \times A \rfloor, 110\}; I_{TBS}=\min\{\lfloor I'_{TBS} \times B \rfloor, 26\};$ $N_{PRB}=\max\{\lfloor N'_{PRB} \times A \rfloor, 1\}; I_{TBS}=\max\{\lfloor I'_{TBS} \times B \rfloor, 1\};$ $N_{PRB}=\min\{\lfloor N'_{PRB} \times A \rfloor, 110\}, I_{TBS}=\max\{\lfloor I'_{TBS} \times B \rfloor, 1\};$ $N_{PRB}=\max\{\lfloor N'_{PRB} \times A \rfloor, 1\}; I_{TBS}=\min\{\lfloor I'_{TBS} \times B \rfloor, 26\}.$ 3. The method according to claim 1, wherein determining the conversion relationship comprises: determining the conversion relationship according to a designated parameter A and/or B configured by a high layer signalling:
when the high layer signalling configures the parameter A and 1≤A≤2, $N_{PRB}=\min\{\lfloor N'_{PRB} \times A \rfloor, 110\}$; and when 0≤A≤1, $N_{PRB}=\max\{\lfloor N'_{PRB} \times A \rfloor, 1\}$;
when the high layer signalling configures the parameter B and 1≤B≤2, $I_{TBS}=\min\{\lfloor I'_{TBS} \times B \rfloor, 26\}$; and when 0≤B≤1, $I_{TBS}=\max\{\lfloor I'_{TBS} \times B \rfloor, 1\}$;
when the parameter A is not configured, $N_{PRB}=N'_{PRB}$; and when the parameter B is not configured, $I_{TBS}=I'_{TBS}$.

4. The method according to claim 3, wherein the parameter A configured by the high layer signalling is one of the following:, 1, 1/5, 1/4, 1/3, 1/2, 2/3, 3/4 and 3/5, and the parameter B is one of the following: 1, 1/5, 1/4, 1/3, 1/2, 2/3, 3/4 and 3/5.

5. A base station, comprising:
an information acquisition unit, configured to acquire a physical resource block allocation number $N'_{PRB}$ and a transmission block size index $I'_{TBS}$;
a conversion unit, configured to determine a conversion relationship, and convert $N'_{PRB}$ and $I'_{TBS}$, according to the conversion relationship, respectively into $N_{PRB}$ and $I_{TBS}$ used in existing calculation for a size of transmission blocks; and
a transmission block size determination unit, configured to, according to $N_{PRB}$ and $I_{TBS}$, calculate the size of the transmission blocks;
wherein the conversion unit is configured to determine the conversion relationship by the following means: determining the conversion relationship in the present scenario according to a corresponding relationship between a scenario and a conversion relationship;
wherein the conversion unit is configured to determine the conversion relationship in the present scenario according to a corresponding relationship between a scenario and a conversion relationship by the following means:
when a physical downlink shared channel bearing the transmission blocks starts to transmit data from a first orthogonal frequency division multiplexing symbol in a time domain of a subframe, and/or, when a subframe transmitting the transmission blocks does not send a cell-specific reference signal, the conversion relationship is:

$I_{TBS}=I'_{TBS}, N_{PRB}=\min\{\lfloor N'_{PRB} \times A \rfloor, 110\}, 1\le A \le 2;$ or $N_{PRB}=N'_{PRB}, I_{TBS}=\min\{\lfloor I'_{TBS} \times B \rfloor, 26\}, 1\le B \le 2;$ when resource elements of a physical downlink shared channel bearing the transmission blocks are being muting, the conversion relationship is:

$I_{TBS}=I'_{TBS}, N_{PRB}=\max\{\lfloor N'_{PRB} \times A \rfloor, 1\},$ where $1/2 \le A \le 1;$ or $N_{PRB}=N'_{PRB}, I_{TBS}=\max\{\lfloor I'_{TBS} \times B \rfloor, 1\},$ where $1/2 \le B \le 1;$ when the number of orthogonal frequency division multiplexing symbols in a downlink pilot time slot (DwPTS) of a special subframe is 6 or 5, the conversion relationship is:

$I_{TBS}=I'_{TBS}, N_{PRB}=\max\{\lfloor N'_{PRB} \times A \rfloor, 1\},$ where $0 \le A \le 3/4;$ or, $N_{PRB}=N'_{PRB}, I_{TBS}=\max\{\lfloor I'_{TBS} \times B \rfloor, 1\},$ where $0 \le B \le 3/4.$ 6. The base station according to claim 5, when 0≤A≤1, the parameter A is one of the following: 1, 1/5, 1/4, 1/3, 1/2, 2/3, 3/4 and 3/5, and when 0≤B≤1, the parameter B is one of the following: 1, 1/5, 1/4, 1/3, 1/2, 2/3, 3/4 and 3/5.

$I_{TBS}=I'_{TBS}, N_{PRB}=\min\{\lfloor N'_{PRB} \times A \rfloor, 110\};$ $N_{PRB}=N'_{PRB}, I_{TBS}=\min\{\lfloor I'_{TBS} \times B \rfloor, 26\};$ $I_{TBS}=I'_{TBS}, N_{PRB}=\max\{\lfloor N'_{PRB} \times A \rfloor, 1\};$ $N_{PRB}=N'_{PRB}, I_{TBS}=\max\{\lfloor I'_{TBS} \times B \rfloor, 1\};$ $N_{PRB}=\min\{\lfloor N'_{PRB} \times A \rfloor, 110\}; I_{TBS}=\min\{\lfloor I'_{TBS} \times B \rfloor, 26\};$ $N_{PRB}=\max\{\lfloor N'_{PRB} \times A \rfloor, 1\}; I_{TBS}=\max\{\lfloor I'_{TBS} \times B \rfloor, 1\};$ $N_{PRB}=\min\{\lfloor N'_{PRB} \times A \rfloor, 110\}, I_{TBS}=\max\{\lfloor I'_{TBS} \times B \rfloor, 1\};$ $N_{PRB}=\max\{\lfloor N'_{PRB} \times A \rfloor, 1\}; I_{TBS}=\min\{\lfloor I'_{TBS} \times B \rfloor, 26\}.$ 7. The base station according to claim 5, wherein the conversion unit is configured to, according to the corresponding relationship between the scenario and the conversion relationship, determine the conversion relationship in the present scenario by the following means: according to a designated parameter A and/or B configured by a high layer signalling, determining the conversion relationship:
when the high layer signalling configures the parameter A and 1≤A≤2, $N_{PRB}=\min\{\lfloor N'_{PRB} \times A \rfloor, 110\}$; and when 0≤A≤1, $N_{PRB}=\max\{\lfloor N'_{PRB} \times A \rfloor, 1\}$;
when the high layer signalling configures the parameter B and 1≤B≤2, $I_{TBS}=\min\{\lfloor I'_{TBS} \times B \rfloor, 26\}$; and when 0≤B≤1, $I_{TBS}=\max\{\lfloor I'_{TBS} \times B \rfloor, 1\}$;
when the parameter A is not configured, $N_{PRB}=N'_{PRB}$; and when the parameter B is not configured, $I_{TBS}=I'_{TBS}$.

8. The base station according to claim 7, wherein the parameter A configured by the high layer signalling is one of the following: 1, 1/5, 1/4, 1/2, 3/4 and 3/5, and the parameter B is one of the following: 1, 1/5, 1/4, 1/2, 3/4 and 3/5.

* * * * *